United States Patent [19]

Bell et al.

[11] Patent Number: 5,543,465

[45] Date of Patent: Aug. 6, 1996

[54] PROCESS FOR THE PRODUCTION OF HYDROPHILIC MEMBRANES

[75] Inventors: Carl-Martin Bell; Manfred Pirner, both of Hechingen; Reinhold Buck, Allerhausen; Hermann J. Gohl, Bisingen, all of Germany

[73] Assignee: Gambro Dialysatoren GmbH & Co., Germany

[21] Appl. No.: 367,458

[22] Filed: Dec. 30, 1994

Related U.S. Application Data

[63] Continuation-in-part of Ser. No. 215,325, Mar. 18, 1994, abandoned.

[30] Foreign Application Priority Data

Mar. 19, 1993 [DE] Germany ............... 43 08 807.4

[51] Int. Cl.$^6$ ............... B01D 71/44; B01D 71/56; B01D 71/68
[52] U.S. Cl. ............... 525/182; 525/189; 521/53; 264/48; 210/500.28; 210/500.38; 210/500.41; 210/500.42; 427/2.3
[58] Field of Search ............... 210/500.28, 500.38, 210/500.42, 500.41; 264/48; 525/182, 189; 521/53; 427/2.3

[56] References Cited

U.S. PATENT DOCUMENTS 5,049,275  9/1991  Gillberg-LaForce et al. ..... 210/500.27
5,203,997  4/1993  Koyama ................... 210/490
5,376,274  12/1994  Muller ................. 210/500.42

FOREIGN PATENT DOCUMENTS 3915348  5/1992  Germany .
17978    7/1979  Japan .
51906    3/1988  Japan .
166219   6/1992  Japan .
293528   10/1992 Japan .

OTHER PUBLICATIONS

English Language Translation of Japanese Patent Application J04293528.

*Primary Examiner*—David Buttner
*Attorney, Agent, or Firm*—Lerner, David, Littenberg, Krumholz & Mentlik

[57] ABSTRACT

A process for the production of hydrophilic membranes using at least one hydrophobic polymer and polyvinyl pyrrolidone as a hydrophilic polymer, membrane-forming shaping of the polymers and immobilization of the polyvinyl pyrrolidone is characterized in that the polyvinyl pyrrolidone is immobilized on and/or in the membrane by treatment with an aqueous solution of peroxodisulphate in a hot condition. The solution of peroxodisulphate is kept substantially free of oxygen during immobilization by degassing the solution. The membranes are used for hemodialysis, hemodiafiltration and hemofiltration of blood.

41 Claims, No Drawings

PROCESS FOR THE PRODUCTION OF HYDROPHILIC MEMBRANES

This is a continuation-in-part of application Ser. No. 08/215,325, filed Mar. 18, 1994 now abandoned.

FIELD OF THE INVENTION

The present invention relates to processes for the production of hydrophilic membranes. More particularly, the present invention relates to processes for the production of hydrophilic membranes utilizing hydrophobic and hydrophilic polymers therefor. Still more particularly, the present invention relates to improved hydrophilic membranes, and their use in connection with processes such as hemodialysis, hemodiafiltration, and hemofiltration.

BACKGROUND OF THE INVENTION

Various publications, such as U.S. Pat. Nos. 3,615,024 and 3,691,068, and German laid-open application (DE-OS) No. 2,917,357, disclose hollow fibers and other membranes comprising a hydrophobic polymer. Such membranes, which are intended to be suitable for use in the hemodialysis, hemodiafiltration and hemofiltration of blood, cannot be wetted in the dry condition with water, so that they may either not be entirely dried, or they must be filled with a hydrophilic fluid, such as glycerin.

In order to eliminate the disadvantages of these requirements, and to improve the wettability, blood compatibility and diffusive permeability of these membranes, it is known to combine the hydrophobic polymers in the membrane with hydrophilic polymers, e.g., in European laid-open application Nos. 0,082,443; 0,168,782; and 0,305,787. In that respect, the hydrophobic polymers used are, for example, polysulphones, polyethersulphones, polycarbonates, polyaramides, polyamides, polyvinyl chloride, modified acrylic acid, polyethers, polyurethanes, polyacrylonitrile, polypropylene, polyetherimides, and copolymers thereof. In accordance with the above-mentioned patent specifications, the hydrophilic polymers used are polyvinylpyrrolidone, polyethyleneglycol, polyglycolmonoester, copolymers of polyethyleneglycol and polypropyleneglycol, cellulose derivatives, polysorbate and polyethylene-polypropyleneoxide copolymers. Polyvinylpyrrolidone is preferably used as the hydrophilic polymer.

Membranes of that type, in comparison with hydrophobic membranes, have the advantage of improved wettability with aqueous solutions, enhanced blood compatibility, and increased levels of diffusive permeability. There is, however, the problem that such membranes, upon reworking and use, gradually give off proportions of the hydrophilic polymer component, which, on the one hand, therefore results in a loss of the hydrophilic properties of the members; and, on the other hand, in medical use in vivo results in accumulation of the hydrophilic component, in particular polyvinylpyrrolidone, in the tissue of the patients.

In order to eliminate these disadvantages of hydrophilic membranes, the process of European laid-open application No. 0,261,734 immobilizes the hydrophilic polymer, such as polyvinylpyrrolidone, by cross-linking with heat treatment. Another known procedure is the cross-linking of polyvinylpyrrolidone with gel formation; for example, by irradiation with gamma rays. In that respect attention is directed, for example, to *Macromol. Sci. Phys.*, B7 (2), pp. 209–244 (1973). Also known is cross-linking by UV-irradiation (*Poly. Sci. USSR*, 11, p. 1638 [1968]) and chemical cross-linking (*Tetrahedron*, 19, pp. 1441–1454 [1963]).

In *Journal of Applied Polymer Science* 23, 2453 (1979), the mechanism of cross-linking for PVP in solution with persulphate is disclosed as a radial reaction. Cross-linking is achieved by combining two macroradicals resulting in a polymeric gel which is virtually insoluble in the swollen condition. In this cross-linking reaction undesired byproducts are produced which may have reduced hemocompatibility. It has been found that OH-groups on surfaces of membranes produced in the known manner are contributing to increased complement activation in comparison with surfaces with OH-groups.

It is therefore the underlying object of the present invention to provide without undesired byproducts a process for the production of hydrophilic membranes using polyvinylpyrrolidone as a hydrophilic polymer, which give off the minimum amount (or none) of polyvinylpyrrolidone by virtue of extraction, and which exhibit improved efficiency.

SUMMARY OF THE INVENTION

In accordance with the present invention, these and other objects have now been accomplished by the invention of a process for the production of hydrophilic microporous membranes by forming the membrane from at least one hydrophobic polymer and a hydrophilic polymer comprising polyvinylpyrrolidone, the membrane being formed by membrane-forming shaping of the polymers, and immobilizing the polyvinylpyrrolidone on and/or in the membrane by treating the membrane with an aqueous peroxodisulphate-containing solution, which solution is kept substantially free of oxygen during the immobilizing reaction. This can be accomplished by, inter alia, either continuously degassing the solution, preferably by means of vacuum treatment or by adding an oxygen binding substance to said solution. The latter is preferably accomplished by adding ascorbic acid or other non-toxic compound which reacts substantially irreversably with oxygen to the solution. In this case, the concentration of the oxygen binding substance should range from between about 1.0 and about 10.0, and preferably between about 2.0 and about 6.0 percent by weight of the peroxodisulphate-containing solution. If a vacuum treatment is selected, then the presssure used should generally be below 40 mm Hg, depending upon such factors as temperature, concentration, and pH. Preferably, the oxygen content is kept lower than 0.1 ml $O_2$ per liter of said solution.

In accordance with one embodiment of the process of the present invention, the process includes forming the membrane from a mixture of the hydrophobic and hydrophilic polymers. In another embodiment, the hydrophilic polymer is provided by coating the membrane with polyvinylpyrrolidone prior to the immobilizing step.

In accordance with another embodiment of the process of the present invention, treating of the membrane with the aqueous peroxodisulphate-containing solution is carried out at an elevated temperature, generally between about 50° and below 80° C., and preferably between about 60° and 75° C.

In accordance with another embodiment of the process of the present invention, treating of the membrane with the aqueous peroxodisulphate-containing solution is carried out for a period of between more than 5 and 30 minutes, preferably between about 5 and 20 minutes, and most preferably for a period of about 10 minutes.

In accordance with another embodiment of the process of the present invention, treating of the membrane with the aqueous peroxodisulphate-containing solution utilizes a peroxodisulphate-containing solution having a peroxodisulphate concentration of between about 0.1 and below 5% by weight, preferably between about 1 and 3% by weight.

In accordance with a preferred embodiment of the process of the present invention, treating of the membrane with the aqueous peroxodisulphate-containing solution comprises flowing the peroxodisulphate-containing solution over the membrane, preferably at a flow rate of between about 100 and 300 ml/min., and most preferably at a flow rate of between about 150 and 300 ml/min.

In accordance with another embodiment of the present invention, applicants have discovered a hydrophilic membrane comprising at least one hydrophobic polymer and a hydrophilic polymer comprising polyvinylpyrrolidone, the membrane being free of undesired byproducts and the polyvinylpyrrolidone being immobilized on the membrane whereby the membrane is substantially free of extractable polyvinylpyrrolidone. In a preferred embodiment the membrane included less than about 15 mg of extractable polyvinylpyrrolidone per 20 grams of membrane, preferably less than about 2 mg of the extractable polyvinylpyrrolidone per 20 grams of membrane.

On an overall basis, the process of the present invention generally takes place in the following manner: the hydrophobic and hydrophilic polymers to be used are dried and then dissolved in a suitable solvent, such a N-methylpyrrolidone. The polymer solution is then filtered and spun in the usual manner, employing the known phase inversion process to give hollow fibers, or cast in order to provide membranes in sheet form. When reference is made to membranes in this description, that term is also intended to include hollow fiber membranes.

The membrane is then possibly pre-coated with polyvinylpyrrolidone and rinsed. The immobilization step according to the present invention then follows. This is accomplished by treatment of the membrane with a peroxodisulphate solution in a hot condition, whereafter rinsing is again effected. When using polyethersulphone or polyaramide as the hydrophobic polymer, steam sterilization is then effected, whereupon the membrane is dried and is then ready for installation in a casing. In the case of hollow fibers, they are cast in a casing by means of polyurethane.

DETAILED DESCRIPTION

The hydrophobic and hydrophilic polymers to be utilized for the preparation of the membranes hereof can be used in quantitative ratios which are known from the state of this art. Desirably, the procedure uses from about 80 to 99.5% by weight of the hydrophobic polymer or polymers, and from about 0.5 to 20% by weight, and preferably from about 0.5 to 10% by weight, of the hydrophilic polymer or polymers, of which one comprises polyvinylpyrrolidone.

The hydrophobic and hydrophilic polymers can therefore be used in a mixture for production of the membranes according to the present invention. The membrane of hydrophobic polymer, or of a mixture of hydrophobic and hydrophilic polymer, can be coated with polyvinylpyrrolidone.

The hydrophobic polymers to be used in accordance with the present invention are those which are also used for membranes in accordance with the state of the art, such as polysulphone, polyethersulphone, polyaramide, polycarbonate, polyamide, polyvinyl chloride, modified acrylic acid, polyether, polyurethane, polyacrylonitrile, polypropylene, polyetherimide, and mixed polymers of these polymers.

Preferred hydrophobic polymers are polysulphone, polyethersulphone, polyaramide and polyamide.

A hydrophilic polymer which is necessarily used in accordance with the present invention is polyvinylpyrrolidone. In addition to polyvinylpyrrolidone, however, it is also possible to use other hydrophilic polymers which are known to be useful for the production of membranes, such as polyethyleneglycol, polyglycolmonoester, copolymers of polyethyleneglycol with polypropyleneglycol, water-soluble cellulose derivatives, polysorbate and polyethylene-polypropylene oxide copolymers.

The polyvinylpyrrolidone used in accordance with this invention preferably has a molecular weight (weight-average) of at least about 8000 daltons, wherein the molecular chains comprise repetitive structural units of the following formula:

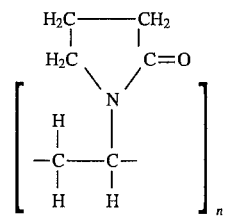

in which n is greater than 120.

In order to produce membranes therefrom, the polymers are dissolved in a suitable solvent, such as dimethylformamide, N-methylpyrrolidone or dimethylacetamide. N-methylpyrrolidone is preferred. Precipitation of the membrane occurs in a precipitation path from pure water or a mixture of water with N-methylpyrrolidone or dimethylsulphoxide. The temperature of the precipitation bath is desirably between about 18° and 65° C. The membranes obtained are usually of a thickness in the range of from about 45 to 50 μm.

Immobilization of the polyvinylpyrrolidone in order to prevent portions of this component from being extracted in the rising operation, and in subsequent use, is effected with a aqueous solution of at least one peroxodisulphate, with heating and degassing by vacuum treatment. Desirably, $K_2S_2O_8$, $Na_2S_2O_8$ or $(NH_4)_2S_2O_8$ are used as the peroxodisulphates. The temperature of the peroxodisulphate solution during treatment of the membrane is preferably in the range of from about 50° to below 80° C., preferably in the range of from about 60° to 75° C. The treatment time is usually in the range of from more than 5 to 30 minutes, preferably in the range of from about 5 to 20 minutes, and in particular of the order of magnitude of about 10 minutes. A dilute peroxodisulphate solution is used for the treatment, desirably with a concentration of from about 0.1 to below 5% by weight, preferably from about 1 to 3% by weight. Preferably, the pH of the solution is kept at pH 4 to 7 by the addition of alkali. The peroxodisulphate solution is preferably passed over, or in the case of hollow fibers through, the membranes, more specifically usually at a flow rate of from about 100 to 300 ml/min, preferably from about 150 to 200 ml/min.

In a particularly preferred embodiment in accordance with the present invention, sodiumperoxodisulphate in a concentration of 3 percent in water is used having a pH of 4.9. The immobilizing treatment is conducted at 65° C. during 15 minutes residence time at a vacuum of about 40 mm Hg.

After this immobilization treatment is completed, the membranes are preferably rinsed with deionized water, and then dried with air at 45° C., and with a water content of less than about 1 g/m³ until the weight is constant.

The following procedure is usually employed for determining the extractable polyvinylpyrrolidone contents: the sheet membranes or hollow fibers to be investigated, with a dry weight of from about 0.5 to 20 g, are cut into pieces and treated with deionized water for 16 hours at 60° C. in a defined volume. In the extract, the concentration of polyvinylpyrrolidone is measured using the procedure described by K. Muller (*Pharm. Acta. Helv.* 42, p. 107 [1968]) and J. Breinlich (*Pharm. Ztg.* 118 [12], p. 330 [1973]). The extractable amount of polyvinylpyrrolidone is converted to the polyvinylpyrrolidone overall weight of the polymer of the dry membrane of 20 g.

The membranes produced in accordance with the present invention are particularly suitable as membranes for medical purposes, in particular for hemodialysis, hemodifiltration and hemofiltration of blood, since as a result of the effective immobilization of the polyvinylpyrrolidone in accordance with this invention, the membranes not only substantially maintain their efficiency, but they also do not give off any polyvinylpyrrolidone into the tissue of the patient.

In the following Examples, the membrane properties listed below were all measured at 37° C.

Furthermore, the following have the specified definitions:

Lp 1: Hydraulic permeability for pure water ($10^{-4}$ cm/s/bar), measuring method as described in "Evaluation of Hemodialysis and Dialysis Membranes," NIH-publication 77-1294 (1977).

Lp (Alb): Hydraulic permeability for a 6% albumin solution ($10^{-4}$ cm/s/bar), measuring method as described in "Evaluation of Hemodialysis and Dialysis Membranes," NIH-publication 77-1294 (1977).

Lp 2: Hydraulic permeability for pure water after the Lp-(Alb)-measurement ($10^{-4}$ cm/s/bar), measuring method as described in "Evaluation of Hemodialysis and Dialysis Membranes," NIH-publication 77-1294 (1977).

P (Cl): Diffusive Permeability for a 0.9% NcCl-solution (cm/s×$10^{-4}$), measuring method as described in "Evaluation of Hemodialysis and Dialysis Membranes," NIH-publication 77-1294 (1977).

SK (Myo): Sieve coefficient for a 0.002% myoglobin solution after 15 minutes (%), measuring method in accordance with DIN 58 353, part 2 C 3, 1988.

SK (Alb): Sieve coefficient of a 6% albumin solution after 15 minutes (%), measuring method in accordance with DIN 58 343, part 2 C 3, 1988.

Moreover, in the following Examples 1 to 8, the treatment according to the invention was the following immobilizing treatment. In the event of the use of sheet membranes, the membranes were submerged during a special residence time in the peroxodisulphate-containing solution, whereas in the event of the use of hollow fiber membrane bundles, the peroxodisulphate-containing solution was pumped through a bundle of hollow fiber membranes having a surface of the total bundle of 1.4 m². The solution was pumped through the hollow fibers with a velocity of 200 ml/min. In all examples as peroxodisulphate sodiumperoxodisulphate $Na_2S_2O_8$ was used, the pH value was adjusted by addition of NaOH.

The following parameters have been used in the Examples 1 through 8:

|  | 1 | 2 | 3 | 4 | 5 | 6 | 7 | 8 |
|---|---|---|---|---|---|---|---|---|
| Temperature of the solution, °C. | 75 | 50 | 65 | 75 | 75 | 75 | 65 | 65 |
| Concentration of the solution, % | 2.5 | 5 | 3.5 | 2.5 | 2.5 | 2.5 | 3 | 3 |
| Residence time, min. | 12 | 20 | 15 | 12 | 12 | 12 | 15 | 15 |
| pH | 5 | 6.5 | 5.5 | 5 | 5 | 5 | 4.9 | 4.8 |
| Vacuum, mm Hg | 40 | 30 | 40 | 40 | 40 | 40 | 40 | 40 |

EXAMPLES

Example 1

Sheet membrane from a spinning solution with 14% polyethersulphone and 4% polyvinylpyrrolidone (PVP) in N-methylpyrrolidone, precipitated in pure water at 18° C.

| Membrane type | Extractable PVP (mg/filter) | Lp1 | P (Cl) |
|---|---|---|---|
| untreated | 320 | 7 | 10.9 |
| treated according to the invention | <2 | 10 | 11.3 |

Example 2

Sheet membranes from a spinning solution with 11% polyamide and 3% PVP in N-methylpyrrolidone, precipitated in pure water at 18° C.

| Membrane type | Extractable PVP (mg/filter) | Lp1 | P (Cl) |
|---|---|---|---|
| untreated | 104 | 4 | 4.2 |
| treated according to the invention | 6 | 120 | 4.5 |

Example 3

Sheet membranes from a spinning solution with 11% polyaramide, 3% PVP and 1 to 4% $CaCl_2$ in N-methylpyrrolidone, precipitated in a mixture of 70% water and 30% N-methylpyrrolidone at 65° C.

| Membrane type | Extractable PVP (mg/filter) | Lp1 | P (Cl) |
|---|---|---|---|
| untreated | 35 | 15 | 10.3 |
| treated according to the invention | 2 | 15 | 13.3 |

Example 4

Hollow fiber membrane bundle with 100 fibers from a spinning solution with 14% polyethersulphone and 11% PVP in N-methylpyrrolidone, precipitated with a centrally through-flowing precipitation bath comprising 50% water, 25% dimethylsulphoxide and 25% N-methylpyrrolidone at 60° C.

| Membrane type | Lp 1 (H$_2$O) | Lp (Alb) (10$^{-4}$ cm/s/bar) | Lp 2 (H$_2$O) | P (Cl) (10$^{-4}$ cms) | SK (Myo) 15 min (%) | SK (Alb) (%) | Extracted PVP (mg/filter) |
|---|---|---|---|---|---|---|---|
| untreated | 120 | 4.5 | 67 | 13.6 | 73 | 2.2 | 30–50 |
| treated according to the invention | 290 | 5.4 | 99 | 15.1 | 93 | 8.2 | <1 |

Example 5

Hollow fiber membrane bundle with 100 fibers from a spinning solution with 12% polyethersulphone and PVP in N-methylpyrrolidone, precipitated with a precipitation bath comprising 70% waster and 30% N-methylpyrrolidone at 60° C.

| Membrane type | Lp 1 (H$_2$O) | Lp (Alb) (10$^{-4}$ cm/s/bar) | Lp 2 (H$_2$O) | P (Cl) (10$^{-4}$ cms) | SK (Myo) 15 min (%) | SK (Alb) (%) | Extracted PVP (mg/filter) |
|---|---|---|---|---|---|---|---|
| untreated | 20 | 4.9 | 21 | 16.5 | 26 | 0.4 | 30–50 |
| treated according to the invention | 32 | 4.3 | 21 | 13.5 | 94 | 1.3 | <1 |

Example 6

Hollow fiber membrane bundle with 100 fibers from a spinning solution with 14% polyethersulphone and 5% PVP in N-methylpyrrolidone, precipitated with a precipitation bath comprising 55% water and 45% N-methylpyrrolidone at 60° C.

| Membrane type | Lp 1 (H$_2$O) | Lp (Alb) (10$^{-4}$ cm/s/bar) | Lp 2 (H$_2$O) | P (Cl) (10$^{-4}$ cms) | SK (Myo) 15 min (%) | SK (Alb) (%) | Extracted PVP (mg/filter) |
|---|---|---|---|---|---|---|---|
| untreated | 120 | 4.5 | 64 | 15.1 | 84 | 1.3 | 31 |
| treated according to the invention | 420 | 5.8 | 90 | 13.0 | 95 | 6.6 | <1 |

Example 7

Sheet membranes from a spinning solution with 14% polyethersulphone and 7% PVP in N-methylpyrrolidone, precipitated in a precipitation bath comprising 70% water and 30% N-methylpyrrolidone at 65° C.

| Membrane type | Extractable PVP (mg/filter) | Lp 1 | P (Cl) |
|---|---|---|---|
| Immobilized according to the invention without preliminary PVP coating | <1 | 110 | 10.1 |
| Immobilized according to the invention with a preliminary coating of a 5% PVP-solution | <1 | 10 | 15.3 |

Example 8

Sheet membranes from a spinning solution with 14% polyethersulphone and 4% PVP in N-methylpyrrolidone, precipitated in a precipitation bath comprising 70% water and 30% N-methylpyrrolidone at 65° C.

| Membrane type | Extractable PVP (mg/filter) | Lp 1 | P (Cl) |
|---|---|---|---|
| Immobilized according to the invention without preliminary PVP coating | 20 | 12.0 | <1 |
| Immobilized according to the invention with a preliminary coating of a 2% PVP-solution | 11 | 11.4 | 5–15 |
| Immobilized according to the invention with a preliminary coating of a 5% PVP-solution | 1 | 11.3 | 5–15 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A process for the production of a hydrophilic membrane comprising forming said membrane from at least one hydrophobic polymer and a hydrophilic polymer comprising polyvinylpyrrolidone, and immobilizing said polyvinylpyrrolidone by treating said membrane with an aqueous peroxodisulphate-containing solution, which solution is kept substantially free of oxygen during the immobilizing reaction by continuously degassing said solution.

2. A process for the production of a hydrophilic membrane comprising forming said membrane from at least one hydrophobic polymer and a hydrophilic polymer comprising polyvinylpyrrolidone, and immobilizing said polyvinylpyrrolidone by treating said membrane with an aqueous peroxodisulphate-containing solution, which solution is kept substantially free of oxygen during the immobilizing reaction by adding an oxygen binding substance to said solution.

3. The process of claim 1, wherein the oxygen content of the peroxodisulphate-containing solution is kept lower than 0.1 ml $O_2$ per liter of said solution.

4. The process of claim 2, wherein the oxygen content of the peroxodisulphate-containing solution is kept lower than 0.1 ml $O_2$ per liter of said solution.

5. The process of claim 1, wherein the solution is degassed by means of vacuum treatment.

6. The process of claim 2, wherein ascorbic acid is said oxygen binding substance.

7. The process of claim 1 further comprising forming said membrane from a mixture of said hydrophobic polymer and said hydrophilic polymer.

8. The process of claim 2 further comprising forming said membrane from a mixture of said hydrophobic polymer and said hydrophilic polymer.

9. The process of claim 1, wherein said hydrophilic polymer is provided by coating said membrane with polyvinylpyrrolidone prior to said immobilizing step.

10. The process of claim 2, wherein said hydrophilic polymer is provided by coating said membrane with polyvinylpyrrolidone prior to said immobilizing step.

11. The process of claim 1, wherein said treating of said membrane with said aqueous peroxodisulphate-containing solution is carried out at an elevated temperature.

12. The process of claim 2, wherein said treating of said membrane with said aqueous peroxodisulphate-containing solution is carried out at an elevated temperature.

13. The process of claim 11, wherein said elevated temperature is between about 50° and about 80° C.

14. The process of claim 12, wherein said elevated temperature is between about 50° and about 80° C.

15. The process of claim 11, wherein said elevated temperature is between about 60° and about 75° C.

16. The process of claim 12, wherein said elevated temperature is between about 60° and about 75° C.

17. The process of claim 11, wherein said treating of said membrane with said aqueous peroxodisulphate-containing solution is carried out for a period of between about 1 and 30 minutes.

18. The process of claim 12, wherein said treating of said membrane with said aqueous peroxodisulphate-containing solution is carried out for a period of between about 5 and 30 minutes.

19. The process of claim 11, wherein said treating of said membrane with said aqueous peroxodisulphate-containing solution is carried out for a period of between more than 5 and 20 minutes.

20. The process of claim 12, wherein said treating of said membrane with said aqueous peroxodisulphate-containing solution is carried out for a period of between about 5 and 20 minutes.

21. The process of claim 19, wherein said treating of said membrane with said aqueous peroxodisulphate-containing solution is carried out for a period of about 10 minutes.

22. The process of claim 20, wherein said treating of said membrane with said aqueous peroxodisulphate-containing solution is carried out for a period of about 10 minutes.

23. The process of claim 1, wherein said treating of said membrane with said aqueous peroxodisulphate-containing solution utilizes a peroxodisulphate-containing solution having a peroxodisulphate concentration of between about 0.1 and 5% by weight.

24. The process of claim 2 wherein said treating of said membrane with said aqueous peroxodisulphate-containing solution utilizes a peroxodisulphate-containing solution having a peroxodisulphate concentration of between about 0.1 and 5% by weight.

25. The process of claim 23, wherein said peroxodisulphate-containing solution has a peroxodisulphate concentration of between about 1 and 3% by weight.

26. The process of claim 24, wherein said peroxodisulphate-containing solution has a peroxodisulphate concentration of between about 1 and 3% by weight.

27. The process of claim 1, wherein said treating of said membrane with said aqueous peroxodisulphate-containing solution comprises flowing said peroxodisulphate-containing solution over said membrane.

28. The process of claim 2, wherein said treating of said membrane with said aqueous peroxodisulphate-containing solution comprises flowing said peroxodisulphate-containing solution over said membrane.

29. The process of claim 27 further comprising flowing said peroxodisulphate-containing solution over said membrane at a flow rate of between about 100 and 300 ml/min.

30. The process of claim 28 further comprising flowing said peroxodisulphate-containing solution over said membrane at a flow rate of between about 100 and 300 ml/min.

31. The process of claim 29 further comprising flowing said peroxodisulphate-containing solution over said membrane at a flow rate of between about 150 and 200 ml/min.

32. The process of claim 30 further comprising flowing said peroxodisulphate-containing solution over said membrane at a flow rate of between about 150 and 200 ml/min.

33. The process of claim 1, wherein said peroxodisulphate is selected from the group consisting of $Na_2S_2O_8$, $K_2S_2O_8$ and $(NH_4)_2S_2O_8$.

34. The process of claim 2, wherein said peroxodisulphate is selected from the group consisting of $Na_2S_2O_8$, $K_2S_2O_8$ and $(NH_4)_2S_2O_8$.

35. The process of claim 1, wherein said aqueous peroxodisulphate-containing solution is kept at a pH 4 to 7 by adding a base to said solution.

36. The process of claim 2, wherein said aqueous peroxodisulphate-containing solution is kept at a pH 4 to 7 by adding a base to said solution.

37. The process of claim 1 further comprising rinsing said membrane with deionized water following said immobilizing step.

38. The process of claim 2 further comprising rinsing said membrane with deionized water following said immobilizing step.

39. The process of claim 5 wherein degassing is conducted at a pressure of about 40 mm Hg or below.

40. The process of claim 2 wherein the concentration of said oxygen binding substance ranges from between about 1.0 and about 10.0 percent by weight of the peroxodisulphate-containing solution.

41. The process of claim 2 wherein the concentration of said oxygen binding substance ranges from between about 2.0 and about 6.0 percent by weight of the peroxodisulphate-containing solution.

* * * * *